Feb. 8, 1944.  E. M. TUCKER ET AL  2,341,000
SNOW TRACTOR
Filed July 3, 1942   2 Sheets-Sheet 1
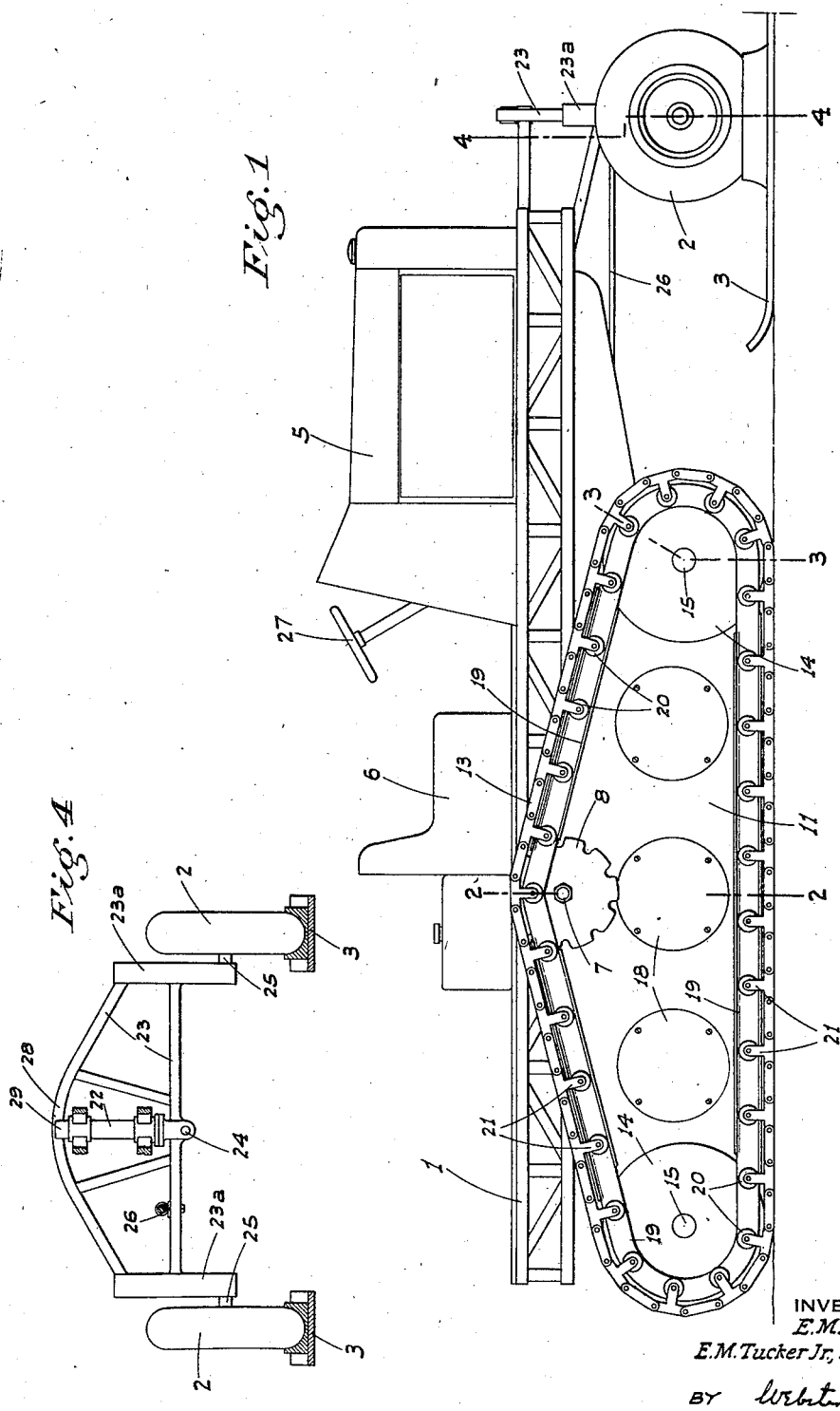
INVENTORS
E. M. Tucker,
E. M. Tucker Jr, J. M. Tucker.
BY Webster & Webster
ATTYS Feb. 8, 1944.  E. M. TUCKER ET AL  2,341,000
SNOW TRACTOR
Filed July 3, 1942  2 Sheets—Sheet 2
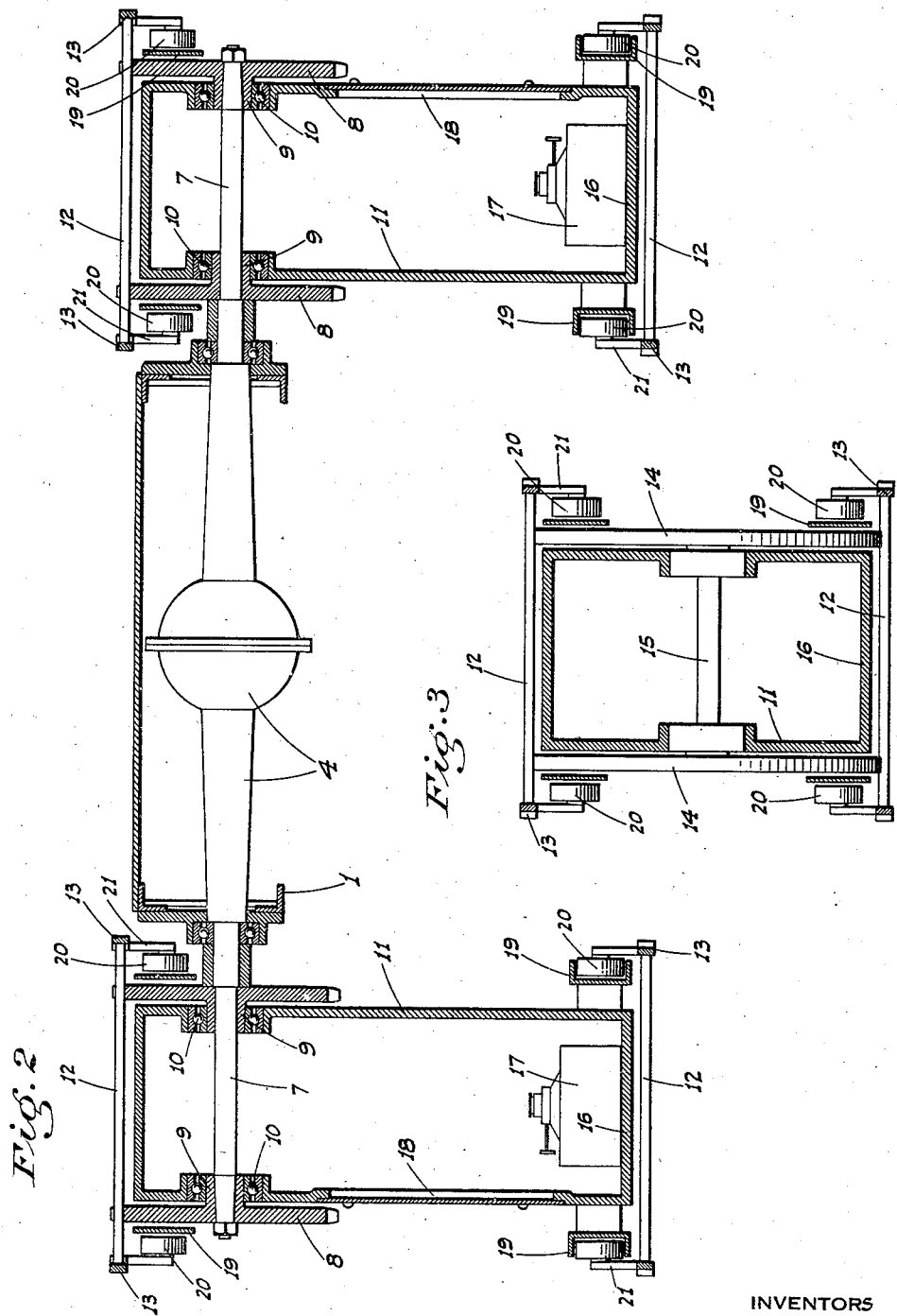
INVENTORS
E. M. Tucker,
E. M. Tucker Jr., J. M. Tucker
BY
ATTYS Patented Feb. 8, 1944

2,341,000

UNITED STATES PATENT OFFICE 2,341,000

SNOW TRACTOR

Emmitt M. Tucker, Emmitt M. Tucker, Jr., and Joseph M. Tucker, Burbank, Calif.

Application July 3, 1942, Serial No. 449,652

5 Claims. (Cl. 180—5)

This invention relates to tractors for use over snow-covered country, and particularly represents improvements over the structure of our Patent No. 2,284,075, dated May 26, 1942, while operating on the same principle.

The previous structure employed pneumatic tired wheels engaged by endless traction elements in the form of chains, and since tires of this type cannot ordinarily be obtained at present, one of the principal objects of the present invention is to provide an endless traction unit which has all the advantages of the previous structure, but avoids the need of pneumatic tires as a part thereof.

The traction obtained by our improved arrangement depends for its successful and efficient operation on the use of a runner immediately above the lower runs of each endless openwork traction member, and this runner tended under certain conditions to freeze and become jammed with snow.

A further object of the present invention is to eliminate the possibility of the runner freezing by providing for the heating of the same when in use. Also the runner is now formed as a part of the support for the shafts of the traction unit and their bearings, which are also retained in a warmed condition which prevents coagulation of the bearing unit and makes for easier operation.

A further object of the invention is to produce a simple and inexpensive device and yet one which will be exceedingly effective for the purpose for which it is designed.

These objects we accomplish by means of such structure and relative arrangement of parts as will fully appear by a perusal of the following specification and claims.

In the drawings similar characters of reference indicate corresponding parts in the several views:

Figure 1 is a side elevation of our improved tractor.

Figure 2 is an enlarged cross-section on line 2—2 of Fig. 1.

Figure 3 is a fragmentary enlarged cross-section on line 3—3 of Fig. 1.

Figure 4 is a transverse section on line 4—4 of Fig. 1 showing the preferred form of front wheel truck mounting.

Referring now more particularly to the characters of reference on the drawings, the tractor includes a main frame 1 of substantially rectangular form, supported at its front end by a front wheel truck 2 mounted and steered as will be described later, the wheels being shoed with runners 3 when in use over snow. A differential and shaft housing unit 4 extends transversely of and is supported from the frame 1 rearwardly of the engine housing 5 and the driver's seat 6, the differentially driven shafts 7 projecting from opposite ends of the housing unit 4, as is customary in automotive practice.

Each shaft, laterally out from the frame, carries a pair of transversely spaced sprockets 8 whose hubs 9 are engaged by anti-friction bearings 10. These bearings for both shafts 7 are mounted in auxiliary frames which are in the form of elongated, substantially closed housings 11 of rectangular form in cross-section. Each shaft is disposed adjacent the top of its housing and substantially midway of its length. The sprockets project above the housing slightly, and engage cross rods 12 which connect endless chains 13, these chains being disposed somewhat further apart than the sprockets so that the latter project between the chains. At each end of the housing, the rods are engaged by discs 14 mounted on a shaft 15 journaled in the housing.

The lower run of each chain and rod unit between the end discs engages the ground or snow, the bottom face 16 of the housing 11 being parallel to and spaced slightly above the adjacent rods. Said face 16, which is smooth exteriorly, therefore forms a snow engaging and compacting area cooperating with the adjacent rods to maintain the latter firmly embedded in the compacted snow so that they will not slip, but instead will give the desired tractive effect.

In order to maintain the housings 11 heated or warmed so as to prevent freezing of the various shaft bearings mounted in the housings, a heating device of suitable character, as indicated at 17, is disposed in each housing, being accessible from covered manholes 18 in the outer side of the housings.

In order to prevent undue lateral shifting of each chain throughout its length, and also to prevent the lower run of the traction unit—even though normally taut—from vertical movement which would cause the adjacent rods to ride against the bottom face 16, we mount endless outwardly facing channel members 19 on each housing laterally out from the sprockets and discs on both sides of the housing and radially in from but parallel to the chains.

Rollers 20 ride in the channels, these rollers being supported from arms 21 fixed with and projecting radially in from alternate links of the opposed chains. The flanges of the channel members, however, are omitted about the discs and sprockets as shown, so as not to interfere with the proper engagement of the chain rods therewith. It will therefore be seen that each housing 11, and the endless traction unit mounted thereon, can rock about the corresponding supporting and driving shaft 7 as the contour of the snow may necessitate, while the lower run of each traction unit is maintained in firm engagement with the snow.

In order to steer the front wheels of the runner unit and also allow of lateral rocking movement thereof independently of the traction units, said wheels are mounted in the following manner:

Turnably supported from the front end of the frame 1 is a vertical post 22, on the lower end of which the bottom member of a transverse frame 23 is pivoted as at 24 for swinging movement in a transverse vertical plane. This frame includes vertical side posts 23a on the lower ends of which the spindles 25 for the front wheels are rigidly mounted. Wheels are used with the runners thereon instead of having the runners directly supported from the posts, in order that the tractor may be operated over bare ground when necessary, and which could not be done if the runners were permanently mounted in place.

Turning of the frame 23 about the post 22 as an axis and the consequent steering of the wheels or runners is effected by a drag link 26 connected to the lower cross member of the frame 23 to one side of the post and operatively connected in the usual manner to the steering wheel 27 of the tractor. The circular portion of the top member of the frame 23 is arcuately curved about the pivot 24 as a center, as shown at 28, and this portion rides a transverse groove 29 formed on the post 22 at its upper end. In this manner the frame 23 is free to swing vertically irrespective of the turned or steered position of the post 22, and the frame 23 is maintained in a proper vertical position without undue strain on the pivot pin 24.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention, what we claim as new and useful and desire to secure by Letters Patent is:

1. In a snow tractor, an endless traction unit having upper and lower runs including transversely spaced chains and cross rods connecting the chains, a sprocket wheel engaging the rods in driving relationship on the upper run of the unit between the chains, and discs engaging the rods in supporting and guiding relationship at the ends of the runs.

2. In a snow tractor, an endless traction unit having upper and lower runs including transversely spaced chains and cross rods connecting the chains, a pair of transversely spaced sprocket wheels engaging the rods on the upper run of the unit adjacent but between the chains and a pair of transversely spaced discs at each end of the unit engaging the corresponding rods.

3. In a snow tractor, an endless traction unit having upper and lower runs including transversely spaced chains and cross rods connecting the chains, a pair of transversely spaced sprocket wheels engaging the rods on the upper run of the unit adjacent but between the chains, a drive shaft connecting the sprockets, an auxiliary frame hung from the shaft and extending lengthwise and vertically between the runs of the unit, and pairs of discs supported from the frame and disposed on the outside of the same and engaging the rods at the ends of the runs.

4. In a snow tractor, an endless traction unit having upper and lower runs including transversely spaced chains and cross rods connecting the chains, a pair of transversely spaced sprocket wheels engaging the rods on the upper run of the unit adjacent but between the chains, a drive shaft connecting the sprockets, an auxiliary frame hung from the shaft and extending lengthwise and vertically between the runs of the unit, pairs of discs outside the frame at its ends engaging the traction unit at the ends of the runs, shafts journaled in the frame and connecting the discs, the frame being in the form of a hollow housing and all the shafts projecting across the interior thereof, and means to heat the interior of the housing.

5. In a snow tractor, a pair of transversely spaced wheels, a vertical transverse frame between and supported by the wheels and including upper and lower members, a vertical post supported for turning movement centrally between the wheels, a horizontal pivot connection between the post and one member of the frame disposed with its axis at right angles to the wheel axis and means applied to said one member of the frame to swing the same about the post; the other member having a central portion curved about said pivot as a center, and the adjacent portion of the post embracing said curved portion in guided relationship.

EMMITT M. TUCKER.
EMMITT M. TUCKER, Jr.
JOSEPH M. TUCKER.